May 21, 1929.  H. ROWLEY  1,714,244
TABLE
Filed April 2, 1927  2 Sheets-Sheet 1
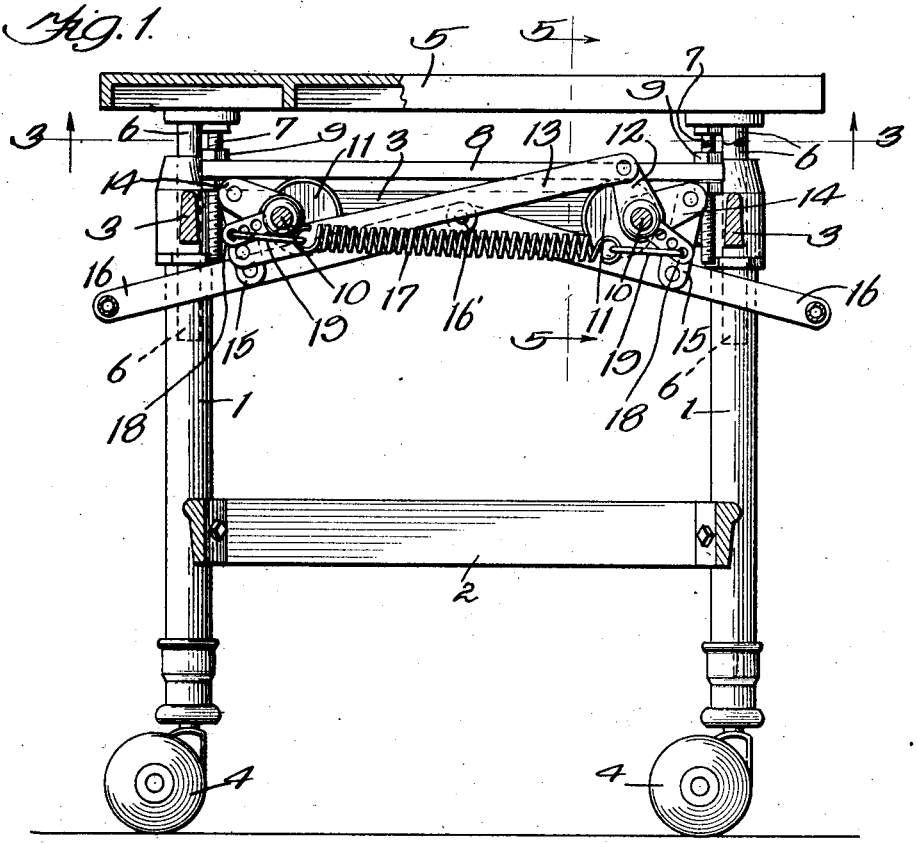
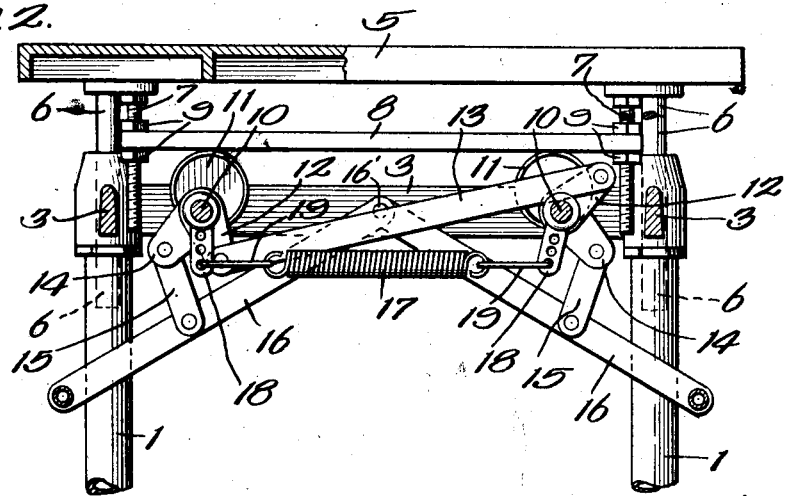
Inventor:
Harry Rowley May 21, 1929.     H. ROWLEY     1,714,244
TABLE
Filed April 2, 1927     2 Sheets-Sheet 2
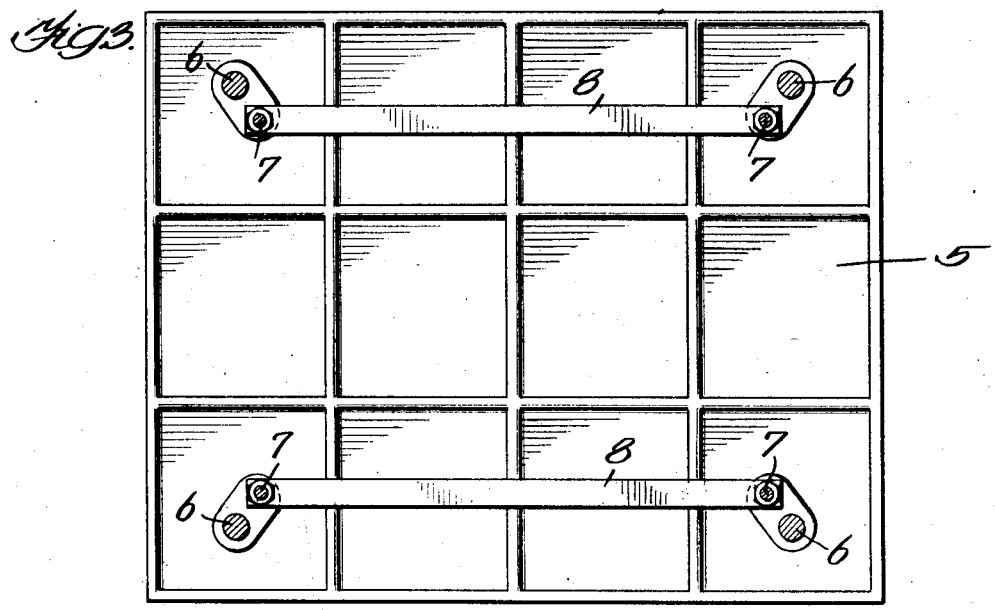
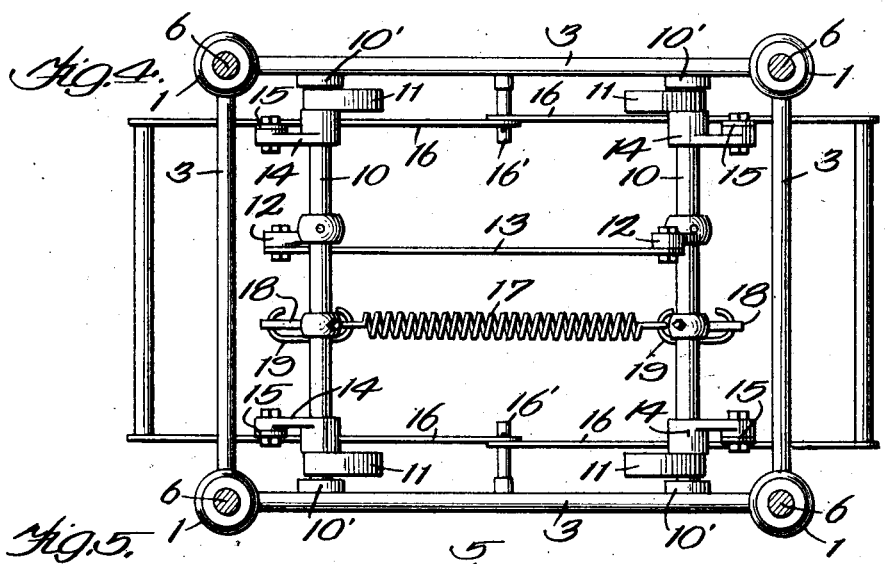
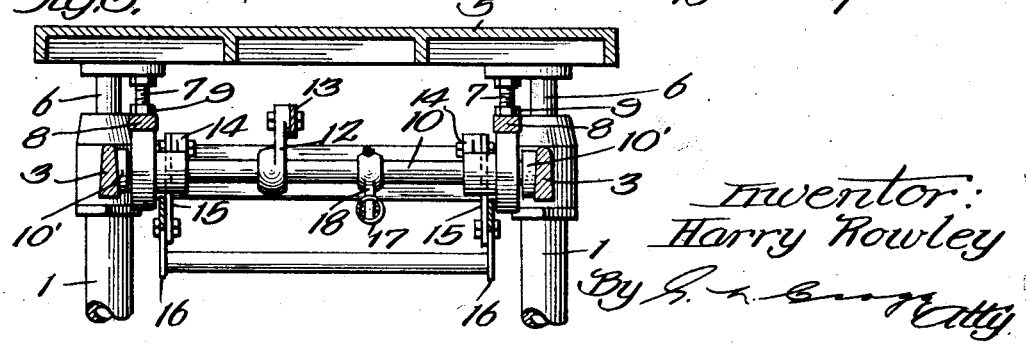
Inventor:
Harry Rowley Patented May 21, 1929.

1,714,244

UNITED STATES PATENT OFFICE.

HARRY ROWLEY, OF TWO RIVERS, WISCONSIN, ASSIGNOR TO THE HAMILTON MANUFACTURING COMPANY, OF TWO RIVERS, WISCONSIN, A CORPORATION OF WISCONSIN.

TABLE.

Application filed April 2, 1927. Serial No. 180,471.

My invention relates to an improvement in tables, preferably in the form of trucks, the structure of my invention being particularly useful for receiving type forms from a table or support, and transferring them to a table or support, the object being to provide a truck with a supporting surface for the type forms, mounted on adjustable devices, whereby the said supporting surface may be adjusted to the level with or raised slightly above or below the surfaces of the tables or devices with which it is used, so that the made up forms may be slid from the table onto the truck and transferred to the molding or stereotyping machines, or may be slid from the truck onto a table or other support without lifting the forms and without lifting or tilting the truck, thereby avoiding all danger of scrambling the type.

My invention is an improvement upon the structure shown in Patent 1,074,753, October 7, 1913 having for its object the provision of improved mechanism for cushioning the adjustable table top, that enters into the construction, from sudden drop.

In the accompanying drawing, Fig. 1 is a sectional elevation of a table or truck as it is preferably constructed in accordance with my invention, the table top being shown at one level; Fig. 2 is a view generally similar to Fig. 1 with portions broken away and with the table top shown adjusted to another level; Fig. 3 is a sectional view from beneath on line 3—3 of Fig. 1; Fig. 4 is a sectional view from above on the same line 3—3 of Fig. 1, with a part of the equipment removed; and Fig. 5 is a sectional view on line 5—5 of Fig. 1.

The truck body is preferably rectangular in shape and is composed of four legs 1 suitably connected near their lower ends by the bars 2 and at or near their upper ends by the strips 3, the whole forming a rigid structure which is mounted on four trailing caster wheels 4. The truck top 5 is of slightly greater length and width than the truck frame, and smooth and flat on top so as to form a solid and even support especially suitable for set up type or type forms. This top 5 carries vertical rods 6 telescopically received in the upper ends of legs 1 and bottoming at their lower ends in said legs to define a lower limiting level for the top. Depending from the under side of the top are two pairs of threaded bolts 7, one bolt being adjacent each post 1 and each pair carrying a metal bar 8, the latter being adjustably secured on the bolts by the nuts 9, two being above and two below each bar.

Mounted in bearings 10' in the side strips 3 of the truck are the shafts 10, one adjacent each end of the truck. Each shaft passes transversely across the truck, under the bars 8, and each carries two eccentrics 11 on which the bars rest and by which they are supported. Each shaft 10 therefore supports one end of the truck top when the latter is elevated above its lowermost position. The eccentrics 11 are keyed to the shafts 10 and bear at their peripheries against the underside of the bars 8, and are so adjusted and located with relation to the other parts, that the top 5 is normally supported by the rods 6. Each shaft is provided with an arm 12, one of which projects upwardly and the other downwardly, and these two arms 12 are connected at their free ends by the connecting rod 13 so that when either shaft is turned the other will be turned also and thus turn the entire series of eccentrics 11 in unison. Each shaft 10 is provided with an arm 14, each of which is connected by a link 15 with an actuating lever 16. The two levers 16 are pivoted upon stub shafts 16' carried by the strips 3, and project in opposite directions and terminate adjacent the two ends of the truck so as to be within convenient reach of the operator.

From the foregoing it will be seen that by pushing down on either lever 16, all the eccentrics will be turned in a direction to elevate the truck top 5, and be carried onto or slightly past their dead centers, so that the top will be sustained in its elevated position after the actuated lever 16 has been released. The parts may be restored to their normal positions by simply pulling up on the free end of either lever. In the use of the truck in the printing art, the top 5 is preferably set slightly below the level of the make up table so that the type forms on the latter may be slid onto the truck top without lifting the forms. In transferring the forms back to the table or other device, the top 5 should be elevated to bring it slightly above the surface onto which the type or form is to be transferred so that it may be slid without lifting it.

To cushion the top against a sudden drop and consequent shock to the type forms thereon, I have connected the spring 17 to the arms 18 that are fixed upon the shafts 10. The ends of the spring desirably receive hooks 19 that are received in holes formed through the arms 18 and radially aligned with the centers of the shafts 10 whereby the tensioning of the spring 17 may be adjusted. The movements of the eccentrics in a direction to lower the table or truck top will be opposed by the spring 17 which simply operates to cushion and not to prevent the descent of said table or truck top, the spring exerting turning efforts upon the shafts in a direction to accomplish this result. The advantage in a spring which is thus coupled with both shafts resides in the fact that the spring absorbs the lost motion occurring in the bearings of the shafts and ensures the similar disposition of the eccentrics with respect to the bars 8 whereby the table or truck top is not apt to be tilted in consequence of the wearing of the bearings and other parts.

Having thus described my invention, I claim:

A truck for transferring forms of set type, comprising a frame, a vertically adjustable top, two bolts only depending from each side of said top, two bars, each of which connects only one pair of said bolts, each of said bars being adjustable on its related bolts toward and away from the under face of the top, four rotatable eccentrics mounted on the frame, two of which engage with one of the bars at spaced points on the latter, and the remaining two of which engage with the other of said bars at spaced points thereon, and means for rotating said eccentrics collectively to elevate the top.

In testimony whereof, I hereunto subscribe my name.

HARRY ROWLEY.